United States Patent
Haggerty

[11] Patent Number: 5,816,193
[45] Date of Patent: Oct. 6, 1998

[54] FEEDING UNIT FOR SMALL PETS

[76] Inventor: Shirley Haggerty, Rd. 1 Box 1367, Stroudsburg, Pa. 18360

[21] Appl. No.: 911,559

[22] Filed: Aug. 14, 1997

[51] Int. Cl.$^6$ ..................................................... A01K 9/00
[52] U.S. Cl. ............................................................... 119/71
[58] Field of Search ............................... 119/71, 72.5, 73

[56] References Cited

U.S. PATENT DOCUMENTS

| | | | |
|---|---|---|---|
| D. 355,510 | 2/1995 | Duncan . | |
| 729,688 | 6/1903 | Smith et al. | 119/71 |
| 886,485 | 5/1908 | Espy | 119/71 |
| 898,878 | 9/1908 | Grunenwald | 119/71 |
| 4,214,554 | 7/1980 | Smith | 119/71 |
| 4,295,293 | 10/1981 | Baclit | 46/202 |
| 4,620,505 | 11/1986 | Thompson et al. | 119/71 |
| 5,067,443 | 11/1991 | Hurnik et al. | 119/71 |
| 5,188,061 | 2/1993 | Lombardi | 119/71 |
| 5,463,981 | 11/1995 | Marcinko et al. | 119/71 |

Primary Examiner—Robert P. Swiatek
Assistant Examiner—James S. Bergin

[57] ABSTRACT

A new feeding unit for small pets for simulating a surrogate mother for feeding purposes. The inventive device includes a housing having a foam front wall. The foam front wall includes a plurality of rows of a plurality of equally spaced angularly disposed channels therethrough. The channels have outer ends disposed below interior ends thereof. A cover is dimensioned for covering the foam front wall of the housing. The cover has openings therethrough in alignment with the outer ends of the channels of the foam front wall. A plurality of feeding bottles are removably positioned within the channels in the foam front wall of the housing. The feeding bottles each have a nippled end portion extending outwardly of the outer ends of the channels.

5 Claims, 2 Drawing Sheets

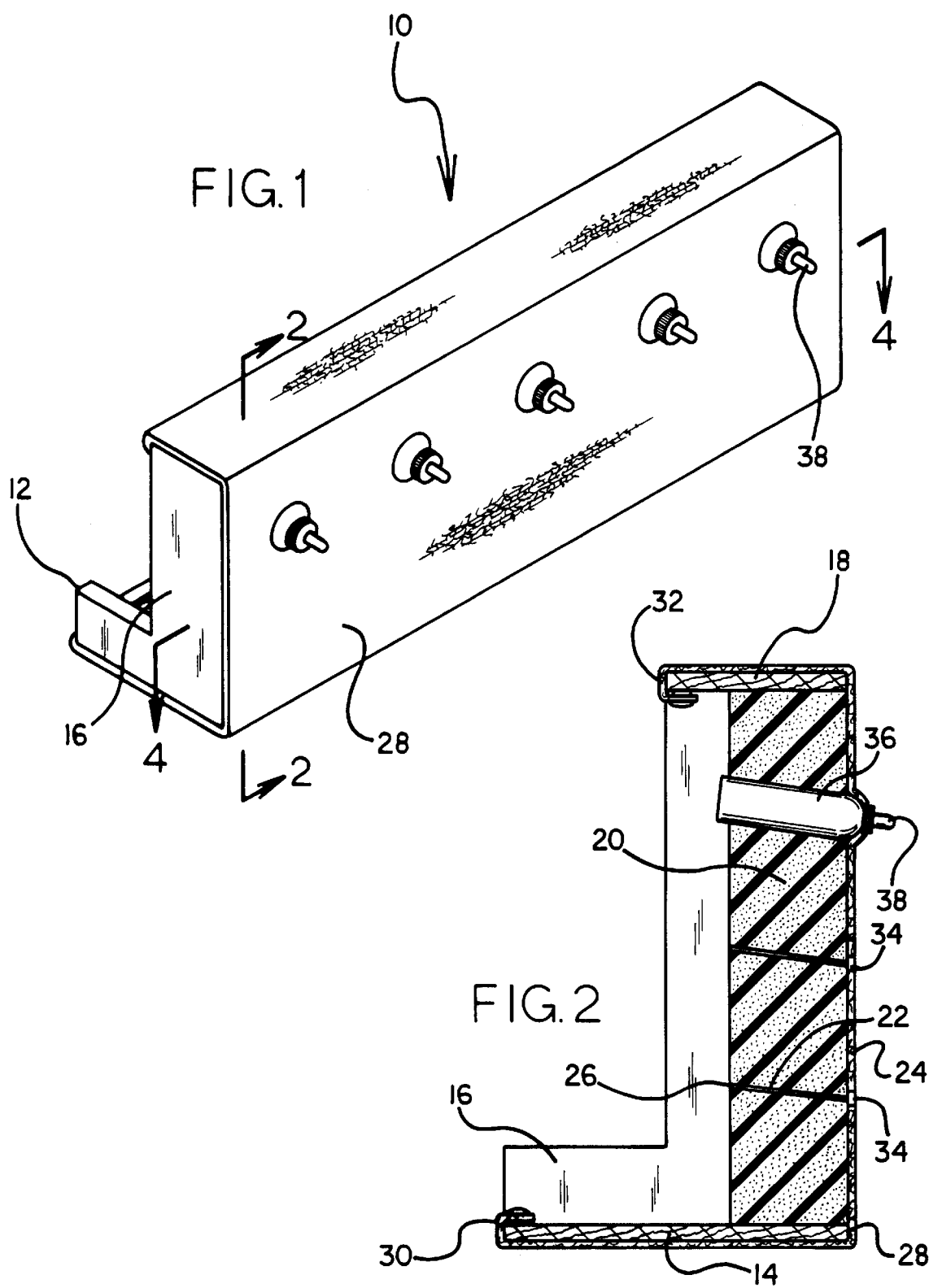

FEEDING UNIT FOR SMALL PETS

BACKGROUND OF THE INVENTION

1. Field of the Invention

The present invention relates to animal nursing devices and more particularly pertains to a new feeding unit for small pets for simulating a surrogate mother for feeding purposes.

2. Description of the Prior Art

The use of animal nursing devices is known in the prior art. More specifically, animal nursing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal nursing devices include U.S. Pat. No. 5,188,061 to Lombardi; U.S. Pat. No. 4,620,505 to Thomson et al.; U.S. Pat. No. Des. 355,510 to Duncan; U.S. Pat. No. 4,214,554 to Smith, Jr.; U.S. Pat. No. 5,067,443 to Hurnik et al.; and U.S. Pat. No. 4,295,293 to Baelit.

While these devices fulfill their respective, particular objectives and requirements, the aforementioned patents do not disclose a new feeding unit for small pets. The inventive device includes a housing having a foam front wall. The foam front wall includes a plurality of rows of a plurality of equally spaced angularly disposed channels therethrough. The channels have outer ends disposed below interior ends thereof. A cover is dimensioned for covering the foam front wall of the housing. The cover has openings therethrough in alignment with the outer ends of the channels of the foam front wall. A plurality of feeding bottles are removably positioned within the channels in the foam front wall of the housing. The feeding bottles each have a nippled end portion extending outwardly of the outer ends of the channels.

In these respects, the feeding unit for small pets according to the present invention substantially departs from the conventional concepts and designs of the prior art, and in so doing provides an apparatus primarily developed for the purpose of simulating a surrogate mother for feeding purposes.

SUMMARY OF THE INVENTION

In view of the foregoing disadvantages inherent in the known types of animal nursing devices now present in the prior art, the present invention provides a new feeding unit for small pets construction wherein the same can be utilized for simulating a surrogate mother for feeding purposes.

The general purpose of the present invention, which will be described subsequently in greater detail, is to provide a new feeding unit for small pets apparatus and method which has many of the advantages of the animal nursing devices mentioned heretofore and many novel features that result in a new feeding unit for small pets which is not anticipated, rendered obvious, suggested, or even implied by any of the prior art animal nursing devices, either alone or in any combination thereof.

To attain this, the present invention generally comprises a housing having an L-shaped cross-section. The housing includes a wide rectangular base portion, a pair of L-shaped side walls and a narrow rectangular top wall. The housing includes a foam front wall disposed between the L-shaped side walls and below the narrow rectangular top wall. The foam front wall includes three rows of five equally spaced angularly disposed channels therethrough. The channels have outer ends disposed below interior ends thereof. A cover is dimensioned for covering the foam front wall of the housing. The cover has a lower edge removably engaging the wide rectangular base portion and an upper edge removably engaging an underside of the narrow rectangular top wall. The cover has openings therethrough in alignment with the outer ends of the channels of the foam front wall. Five feeding bottles are removably positioned within the channels in the foam front wall of the housing. The feeding bottles each have a nippled end portion extending outwardly of the outer ends of the channels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new feeding unit for small pets apparatus and method which has many of the advantages of the animal nursing devices mentioned heretofore and many novel features that result in a new feeding unit for small pets which is not anticipated, rendered obvious, suggested, or even implied by any of the prior art animal nursing devices, either alone or in any combination thereof.

It is another object of the present invention to provide a new feeding unit for small pets which may be easily and efficiently manufactured and marketed.

It is a further object of the present invention to provide a new feeding unit for small pets which is of a durable and reliable construction.

An even further object of the present invention is to provide a new feeding unit for small pets which displays "low cost of manufacture with regard to both materials and labor, and which accordingly presents a low sale prices" to the consuming public, thereby making such feeding unit for small pets economically available to the buying public.

Still yet another object of the present invention is to provide a new feeding unit for small pets which provides in the apparatuses and methods of the prior art some of the advantages thereof, while simultaneously overcoming some of the disadvantages normally associated therewith.

Still another object of the present invention is to provide a new feeding unit for small pets for simulating a surrogate mother for feeding purposes.

Yet another object of the present invention is to provide a new feeding unit for small pets which includes a housing having a foam front wall. The foam front wall includes a plurality of rows of a plurality of equally spaced angularly disposed channels therethrough. The channels have outer ends disposed below interior ends thereof. A cover is dimensioned for covering the foam front wall of the housing. The cover has openings therethrough in alignment with the outer ends of the channels of the foam front wall. A plurality of feeding bottles are removably positioned within the channels in the foam front wall of the housing. The feeding bottles each have a nippled end portion extending outwardly of the outer ends of the channels.

Still yet another object of the present invention is to provide a new feeding unit for small pets that adjusts as the pet grows.

Even still another object of the present invention is to provide a new feeding unit for small pets that can feed multiple pets at one time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new feeding unit for small pets according to the present invention.

FIG. 2 is a cross-sectional view of the present invention as taken along line 2—2 of FIG. 1.

DESCRIPTION OF THE PREFERRED EMBODIMENT

Figure 3:
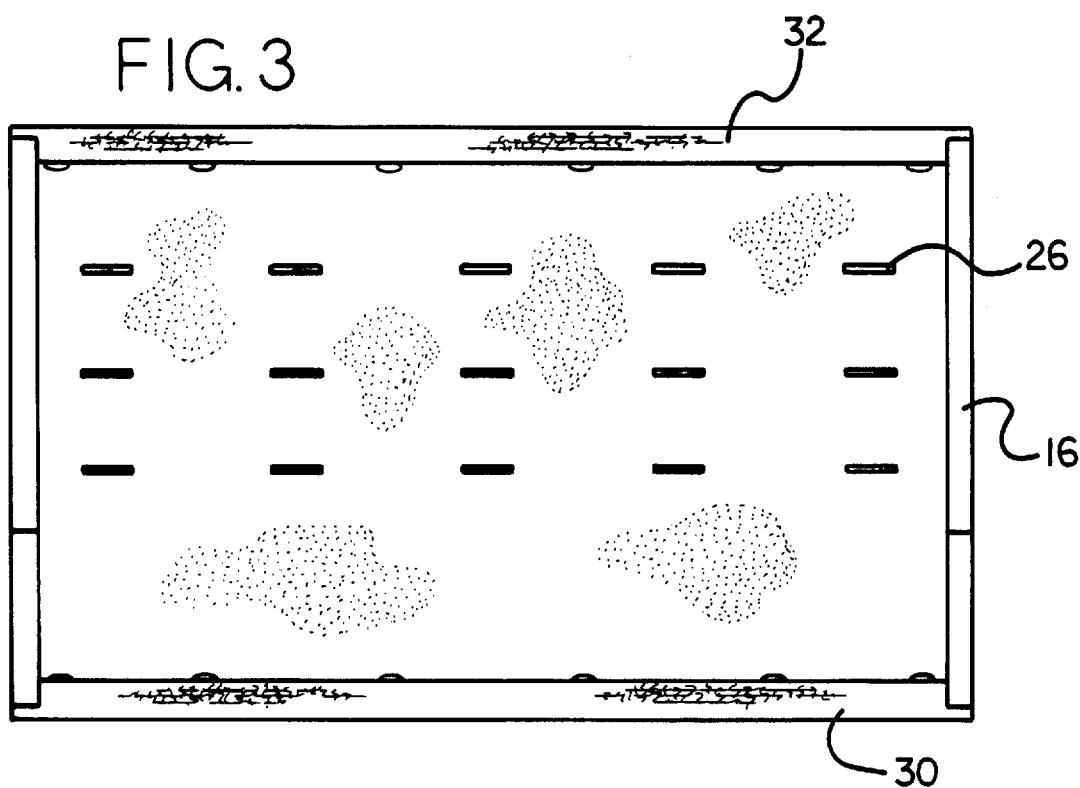
FIG. 3 is a rear elevation view of the present invention.
Figure 4:
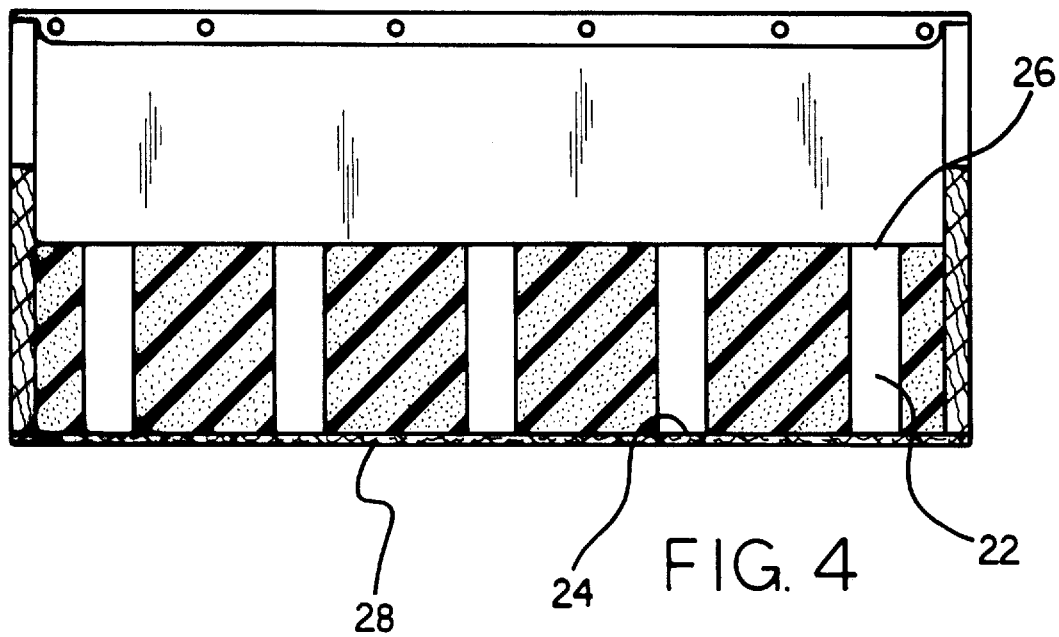
FIG. 4 is a cross-sectional view of the present invention as taken along line 4—4 of FIG. 1.

With reference now to the drawings, and in particular to FIGS. 1 through 4 thereof, a new feeding unit for small pets embodying the principles and concepts of the present invention and generally designated by the reference numeral 10 will be described.

As best illustrated in FIGS. 1 through 4, the feeding unit for small pets 10 comprises a housing 12 having an L-shaped cross-section. The housing 12 includes a wide rectangular base portion 14, a pair of L-shaped side walls 16 and a narrow rectangular top wall 18. The housing 12 includes a foam front wall 20 disposed between the L-shaped side walls 16 and below the narrow rectangular top wall 18. The foam front wall 20 includes three rows of five equally spaced angularly disposed channels 22 therethrough. The channels 22 have outer ends 24 disposed below interior ends 26 thereof.

A cover 28 is dimensioned for covering the foam front wall 20 of the housing 12. The cover 28 has a lower edge 30 removably engaging the wide rectangular base portion 14 and an upper edge 32 removably engaging an underside of the narrow rectangular top wall 18. The cover 28 has openings 34 therethrough in alignment with the outer ends 24 of the channels 22 of the foam front wall 20. The cover 28 simulates the fur or skin of the pet.

Five feeding bottles 36 are removably positioned within the channels in the foam front wall 20 of the housing 12. The feeding bottles 36 each have a nippled end portion 38 extending outwardly of the outer ends 24 of the channels 22. The angular orientation of the channels 22 will orient the bottles 36 in the proper position for nursing. Thus, the milk or other beverage within the bottle 36 will gravitate towards the nippled end portion 38 for consumption by the pet. The bottles 36 can be moved between the rows of channels 22 to accommodate a variety of sizes of pets.

In use, a pet owner would fill the bottles 36 with a selected type of beverage or food and position them within the channels 22 so that the nippled portions 38 were accessible through the foam front wall 20 and the bottles 36 were stabilized within the channels 22. The pets could then drink from the nippled portions 38 as their bodies are positioned against the cover 28. Alternately, the present invention could feature a battery or electric powered heating system to resemble a mother's actual body temperature. In addition, an alternate design could accommodate a plastic, battery-powered diaphragm that would be positioned along the cover 28 and would move in and out to simulate the mother's heartbeat. The heating system could also feature ceramic holders within the channels 22 for the bottles 36 that would maintain them at a constant temperature for an extended period of time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A feeding unit for small pets for simulating a surrogate mother for feeding purposes comprising, in combination:

a housing having an L-shaped cross-section, the housing including a wide rectangular base portion, a pair of L-shaped side walls and a narrow rectangular top wall, the housing including a foam front wall disposed between the L-shaped side walls and below the narrow rectangular top wall, the foam front wall including three rows of five equally spaced angularly disposed channels therethrough, the channels having outer ends disposed below interior ends thereof;

a cover dimensioned for covering the foam front wall of the housing, the cover having a lower edge removably engaging the wide rectangular base portion and an upper edge removably engaging an underside of the narrow rectangular top wall, the cover having openings therethrough in alignment with the outer ends of the channels of the foam front wall; and five feeding bottles removably positioned within the channels in the foam front wall of the housing, the feeding bottles each having a nippled end portion extending outwardly of the outer ends of the channels.

2. A feeding unit for small pets for simulating a surrogate mother for feeding purposes comprising, in combination:

a housing having a foam front wall, the foam front wall including a plurality of rows of a plurality of equally spaced angularly disposed channels therethrough, the channels having outer ends disposed below interior ends thereof;

a cover dimensioned for covering the foam front wall of the housing, the cover having openings therethrough in alignment with the outer ends of the channels of the foam front wall; and a plurality of feeding bottles removably positioned within the channels in the foam front wall of the housing, the feeding bottles each having a nippled end portion extending outwardly of the outer ends of the channels.

3. The feeding unit for small pets as set forth in claim 2 wherein the housing has an L-shaped cross-section, the housing including a wide rectangular base portion, a pair of L-shaped side walls and a narrow rectangular top wall, the foam front wall disposed between the L-shaped side walls and below the narrow rectangular top wall.

4. The feeding unit for small pets as set forth in claim 2 wherein the cover has a lower edge removably engaging the wide rectangular base portion and an upper edge removably engaging an underside of the narrow rectangular top wall.

5. The feeding unit for small pets as set forth in claim 2 wherein the housing includes three rows of five channels.

\* \* \* \* \*